United States Patent [19]

Hennings et al.

[11] Patent Number: 4,606,116
[45] Date of Patent: Aug. 19, 1986

[54] NON-LINEAR RESISTOR AND METHOD OF MANUFACTURING THE SAME

[75] Inventors: Detlev Hennings; Axel Schnell; Herbert Schreinemacher, all of Aachen, Fed. Rep. of Germany

[73] Assignee: U.S. Philips Corporation, New York, N.Y.

[21] Appl. No.: 753,836

[22] Filed: Jul. 11, 1985

Related U.S. Application Data

[62] Division of Ser. No. 382,909, May 28, 1982, Pat. No. 4,551,269.

[30] Foreign Application Priority Data

May 29, 1981 [DE] Fed. Rep. of Germany ....... 3121290

[51] Int. Cl.$^4$ ............................................. H01C 17/00
[52] U.S. Cl. ................... 29/610 R; 29/612; 252/520; 252/521
[58] Field of Search .......... 252/518, 520, 521, 62.3 Y, 252/62.3 BT; 338/20, 21, 307; 501/135, 136, 138, 139; 382/909; 29/610 R, 612; 264/61, 65, 66

[56] References Cited

U.S. PATENT DOCUMENTS

| 4,347,167 | 8/1980 | Payne et al. ...................... 252/520 |
| 4,405,477 | 9/1983 | Marase et al. ................ 252/62.3 BT |
| 4,436,650 | 3/1984 | Bower .................................. 252/521 |
| 4,438,214 | 3/1984 | Masuyama et al. ................. 252/520 |

FOREIGN PATENT DOCUMENTS 0044981 2/1982 European Pat. Off. .

*Primary Examiner*—Josephine L. Barr
*Attorney, Agent, or Firm*—Norman N. Spain

[57] ABSTRACT

Figure 1:
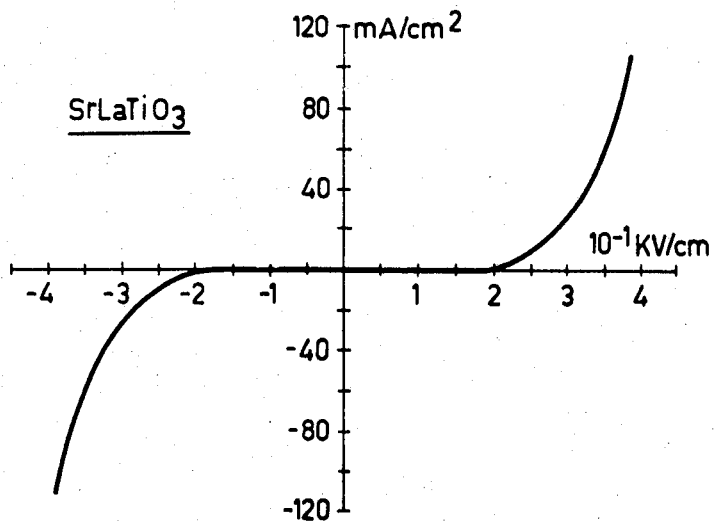

A non-linear resistor having an operational field strength which optionally is formed as a VDR- or as an NTC-resistor having a ceramic sintered body on the basis of a polycrystalline alkaline earth metal titanate doped with a small quantity of a metal oxide so as to produce an N-type conductivity, in which the sintered body comprises at its grain boundaries insulating layers formed by re-oxidation of the sintered body and consists of an alkaline earth metal titanate having a Perowskite structure of the general formula $$(A_{1-x}Ln_x)TiO_3 \cdot yTiO_2 \text{ or } A(Ti_{1-x}Me_x)O_3 \cdot yTiO_2,$$

wherein: A=alkaline earth metal; Ln=rare earth metal; Me=metal having a valency of 5 or more; 0.0005<x<solubility limit in the Perowskite phase; y=0.001 to 0.02. The sintered body becomes adjustable in its non-linear resistance variation by selection of the re-oxidation temperature and of the re-oxidation duration in such manner that an initially present NTC-characteristic gradually is observable only at ever increasing temperatures and changes into a VDR-characteristic in the range of the operating temperature of the resistor. FIG. 1.

13 Claims, 7 Drawing Figures

NON-LINEAR RESISTOR AND METHOD OF MANUFACTURING THE SAME

This is a division, of application Ser. No. 382,909, filed May 28, 1982, now U.S. Pat. No. 4,551,269.

The invention relates to a non-linear resistor having a ceramic sintered body on the basis of a polycrystalline alkaline earth metal titanate doped with a metal oxide to produce an N-type conductivity, the body having electrodes provided on oppositely located surfaces. The invention furthermore relates to a method of manufacturing such a resistor.

Non-linear resistors are to be understood to mean in this case resistors having an NTC-characteristic (resistance value decreases independently of the applied voltage with increase in temperature) and resistors having a VDR-characteristic (resistance value depends only on the applied voltage).

From U.S. patent application Ser. No. 263,321 (=published EP-PA No. 40,881) a voltage-dependent resistor is known which is based on N-doped strontium titanate to which prior to sintering a small quantity of a lead germanate phase was added which leads to the formation of insulating grain boundary layers in the polycrystalline grain texture of the sintered body. Due to its comparatively high operational field strength—a current density, for example, of approximately 3 mA/cm² is obtained only with fields of approximately 6 kV/cm—this known resistor has only a limited field of application; for example, it is not suitable for modern semiconductor switching circuits operating at low voltages.

It is the object of the invention to provide a non-linear resistor as mentioned above and a method of manufacturing same in such a manner that not only a non-linear resistor having a low operational field strength is obtained, but that said resistor is formed optionally as a VDR- or as an NTC-resistor.

According to the invention this object is achieved when the sintered body comprises at its grain boundaries insulating layers formed by re-oxidation of the sintered body and consists of an alkaline earth metal titanate containing excess $TiO_2$ and having a Perowskite structure and a composition defined by one of the general formulae

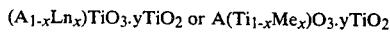

$(A_{1-x}Ln_x)TiO_3 \cdot yTiO_2$ or $A(Ti_{1-x}Me_x)O_3 \cdot yTiO_2$ in which:
A = alkaline earth metal
Ln = rare earth metal, including yttrium
Me = metal having a valency of 5 or more
$0.0005 < x <$ solubility limit in the Perowskite phase
$y = 0.001$ to $0.02$.

A method of manufacturing the sintered body of the above-mentioned type is carried out according to the invention so that the ceramic body is first sintered in a reducing atmosphere and that said sintered body is then re-oxidized in an oxidizing atmosphere, preferably in air, in which the sintered body, by choice of the reoxidation temperature and the reoxidation duration, is adjustable in its non-linear resistance variation such that an initially present NTC-characteristic as a function of the oxidation state gradually can be observed only at increasing temperatures and, in the range of the operating temperature of the resistor, changes into a VDR-characteristic.

As a result of the sintering in a reducing atmosphere the sintered body is made continuously semiconductive and subsequently grain boundary layers of the semiconductor grains of the polycrystalline grain structure of the sintered body are converted by the formation of high-ohmic oxide layers by re-oxidation. In accordance with the value of the reoxidation temperature and the reoxidation duration, sintered bodies can thus be manufactured at will in which the NTC-characteristic or the VDR-characteristic predominates.

According to advantageous modified embodiments of the invention, strontium is chosen as an alkaline earth metal and $La_2O_3$, $Nb_2O_5$ or $WO_3$ are chosen as doping metal oxides. The incorporation of the doping metal oxide in the Perowskite lattice of the $SrTiO_3$ occurs by reaction already during the pre-sintering in the manufacture of the sintered body. In addition to the said dopants, other metal oxides are also feasible, for example, $Y_2O_3$, $Sm_2O_3$, $Ta_2O_5$, $As_2O_5$, $Sb_2O_5$, $MoO_3$ or $U_3O_8$.

In accordance with the ion radius the doping ions are incorporated either in Sr-sites or in Ti-sites in the Perowskite lattice of the $SrTiO_3$. It has been demonstrated by means of X-ray structure analysis that the large $La^{3+}$-ion ($r_{La3+} = 0.122$ nm) is incorporated in Sr-sites ($r_{Sr2+} = 0.127$ nm). By analogous studies on $PbTiO_3$ it could be demonstrated that the smaller $Nb^{5+}$-ion ($r_{Nb5+} = 0.069$ nm) is incorporated in Ti-sties ($r_{Ti4+} = 0.064$ nm). On the basis of the ion radius of the $W^{6+}$-ion ($r_{W6+} = 0.062$ nm) it can accordingly be concluded that it is also incorporated in Ti-sites.

After the presintering the doped alkaline earth metal titanate is brought into a sinterable finely pulverized state by grinding in a ball mill and is formed into usually a disc-shaped body by compression. Only when sintering is carried out in a reducing atmosphere do the donor charges contribute directly to the conductivity. This condition is referred to as electron compensation. The chemical characterization of such electron-compensated, semiconductor Perowskite phases with n-doping follows for the dopings according to the invention:

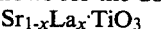
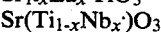
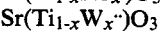

$Sr_{1-x}La_x\cdot TiO_3$
$Sr(Ti_{1-x}Nb_x\cdot)O_3$
$Sr(Ti_{1-x}W_x\cdot\cdot)O_3$
· = symbol for donor electron.

The electron-compensated materials have a resistivity in the order of magnitude of 1 Ωcm.

When on the contrary the samples are sintered in an oxidizing atmosphere, the compensation of the donor charges occurs via cation vacancies, mainly vacancies in Sr-sites. Such vacancy-compensated materials are highly insulating since the cation vacancies operated as very strong electron acceptors. The chemical characterization of vacancy-compensated materials are as follows for the dopings according to the invention:

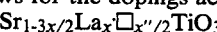
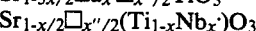
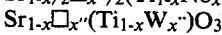

$Sr_{1-3x/2}La_x\square_{x''/2}TiO_3$
$Sr_{1-x/2}\square_{x''/2}(Ti_{1-x}Nb_x\cdot)O_3$
$Sr_{1-x}\square_{x''}(Ti_{1-x}W_x\cdot\cdot)O_3$
' = symbol for acceptor electron
□ = symbol for lattice vacancies These vacancy-compensated materials have a resistivity in the order of magnitude of $10^{13}$ Ω·cm.

The invention is based on the recognition of the fact that the electron-compensated semiconductor ceramic can be converted into the highly insulating vacancy-compensated form by re-oxidation. A variety of transition states can be produced between the purely electron-compensated form which corresponds to a Perowskite ceramic having NTC-properties, and the purely vacancy-compensated form which corresponds to a Perowskite ceramic having VDR-properties. Reaction kinetic experiments on electron-compensated semiconductive $Ba_{1-x}La_xTiO_3$ ($x \approx 0.005$ to 0.02) have demonstrated that the oxidation always begins at the grain boundaries and a semiconductor ceramic material having highly insulating grain boundary layers is formed. Analogous processes occur in the oxidation of semiconductor N-doped $SrTiO_3$.

A particular advantage which is obtained with the invention is the low operational field strength in resistors having VDR-characteristic in addition to the adjustability of the characteristic of the resistors comprising a ceramic sintered body according to the present Application. As compared with the known resistor according to U.S. patent application Ser. No. 263,321, the resistors having VDR-characteristic according to the present Application are distinguished by an operational field strength which is lower by a factor of $\geq 20$.

As a result of this, varistors with sintered bodies according to the present invention become particularly applicable for modern semiconductor switching circuits operating at low voltages. The varistors having sintered bodies with La-doping, Nb-doping or W-doping all show the said low operational field strength. For this it is important for the sintered body to have a low $TiO_2$-excess and to comprise insulating layers formed by re-oxidation. These insulating layers may show a gradient in the resistivity from the edge zones of the sintered body over the thickness of the sintered body.

Grain growth of the titanate starting material during sintering depends upon the presence of an excess of $TiO_2$ the dopant concentration and the sintering conditions particularly the sintering temperature. The grain size of the polycrystalline structure has a decisive influence on the operational field strength of the non-linear resistor. The smaller the grain size, the higher is in general the operational field strength of the resistor.

It should be noted, however, that when the operational field strength is too low the current index $\beta$ assumes increasingly unfavourable values. The current index $\beta$ appears from the formula $U = C \cdot I^\beta$, where $I$ = current through the resistor in amperes; $U$ = the voltage drop across the resistor in volts; $C$ = a geometry-dependent constant, it indicates the voltage at $I = 1A$ (in practical cases it may assume values between 15 and a few thousand); $\beta$ = current index, coefficient on non-linearity or control factor which is material-dependent and is a measure of the steepness of the current-voltage characteristic. Preferably the $\beta$ value should be as small as possible, because at a small value of $\beta$ large current variations lead only to small voltage variations across the non-linear resistor.

Figure 2A:
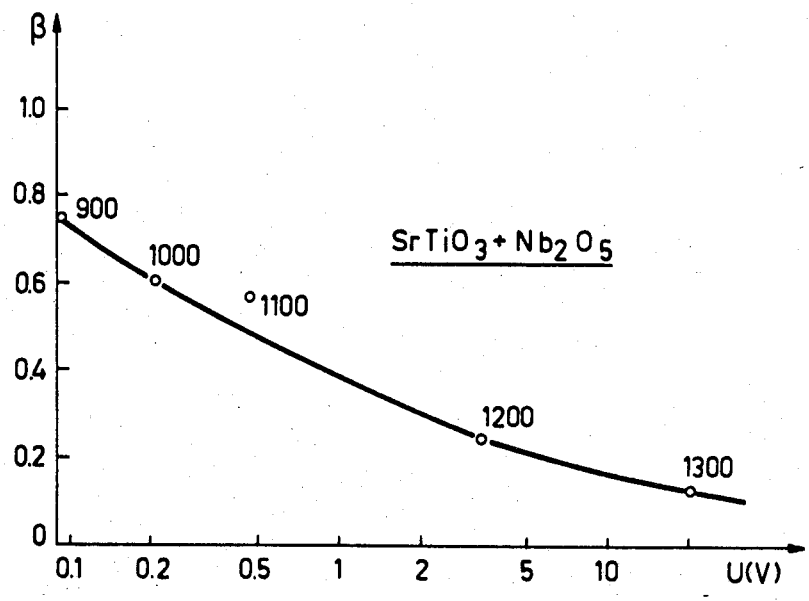
Figure 2B:
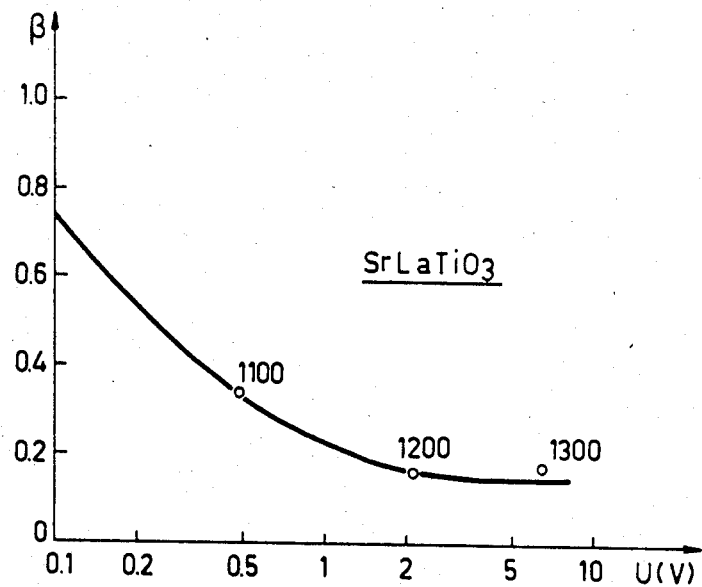
Figure 2C:
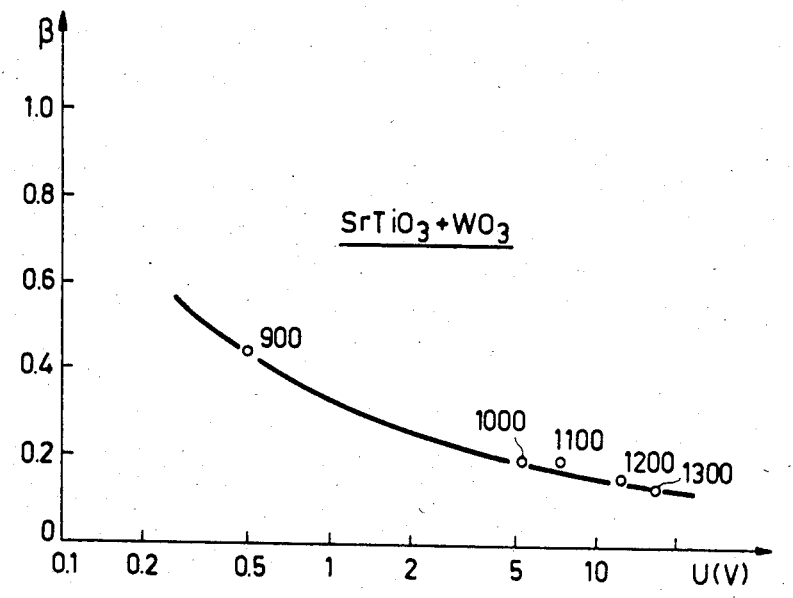

Embodiments of the invention and their operation will now be described in greater detail with reference to the drawings, in which FIG. 1 shows a current-voltage characteristic of a non-linear resistor according to the invention, FIGS. 2a to 2c show the dependence of the operational voltage with a current of 1 mA and of the current index $\beta$ on the re-oxidation temperature for different non-linear resistors according to the invention.

Figure 3:
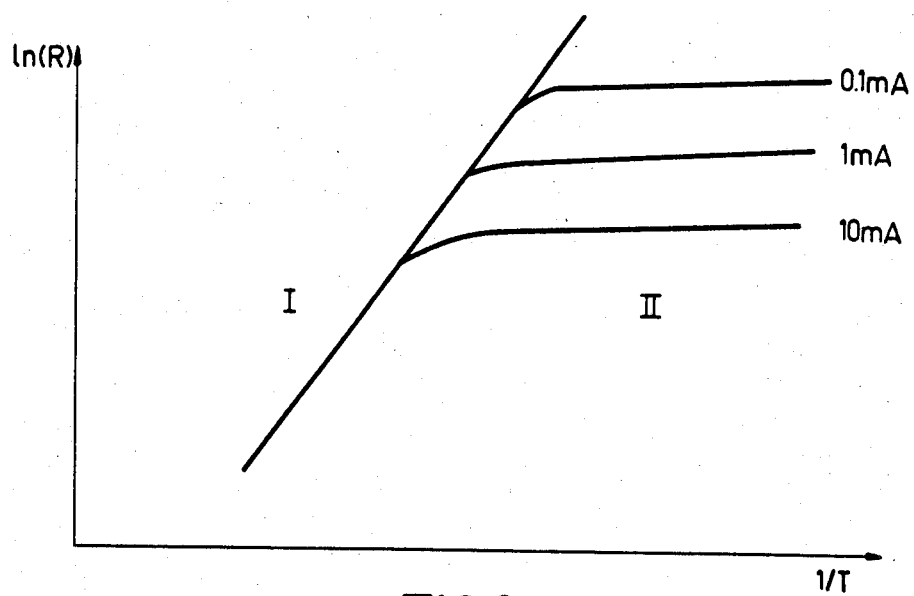
Figure 4:
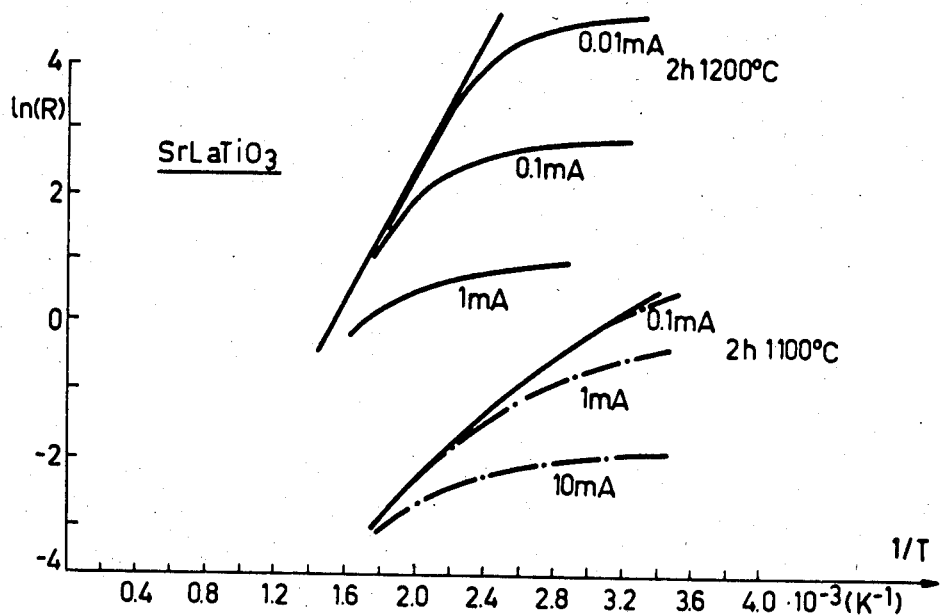

FIG. 3 is a diagrammatic representation of the current and temperature dependence of the electric resistance of a non-linear resistor in accordance with the invention, and FIG. 4 shows the current and temperature dependence of the electric resistance of a non-liner resistor in accordance with the invention at different re-oxidation temperatures.

The manufacture of non-linear resistors according to the present invention will first be described hereinafter.

1. MANUFACTURE OF THE CERAMIC SINTERED BODIES $SrCO_3$ and $TiO_2$ were used as starting materials for the ceramic sintered body and $La_2O_3$, $Nb_2O_5$ or $WO_3$ were used as doping metal oxides. In the preparation of the ceramic mass according to the compositions $(Sr_{1-x}La_x)TiO_3 \cdot yTiO_2$, $Sr(Ti_{1-x}Nb_x)O_3 \cdot yTiO_2$ or $Sr(Ti_{1-x}W_x)O_3 \cdot yTiO_2$ with $0.0005 < x <$ solubility limit in the Perowskite phase and $y = 0.001$ to 0.02, the $TiO_2$-excess with 0.001 to 0.02 has hence been chosen that there is always a small excess of $Ti^{4+}$-ions. As a result of this, a liquid sintering phase with the $SrTiO_3$ is formed at a sintering temperature above 1400° C.—it is assumed that it deals with the eutectic $SrTiO_3$-$TiO_2$ occurring at $\approx 1440°$ C., which may also occur at lower temperatures by the addition of dopants. A liquid sintering phase of this type favours the desired coarse granular grain growth.

For the manufacture of the ceramic bodies the following quantities were weighed-in.

For $Sr(Ti_{0.99}Nb_{0.01})O_3 \cdot 0.01TiO_2$: 59.056 g of $SrCO_3$ 31.96 g of $TiO_2$ and 0.5316 g of $Nb_2O_5$;

for $(Sr_{0.99}La_{0.01})TiO_3 \cdot 0.01TiO_2$: 58.465 g of $SrCO_3$ 32.28 g of $TiO_2$ 0.6517 g of $La_2O_3$;

for $Sr(Ti_{0.996}W_{0.004})O_3 \cdot 0.01TiO_2$: 59.056 g of $SrCO_3$ 32.152 g of $TiO_2$ 0.371 g of $WO_3$.

They were mixed wet in a ball mill, for example, of agate. Pre-sintering at 1150° C. for 15 hours is then carried out. The pre-sintered powder is again ground while wet (1 hour in a ball mill, for example, of agate). The ground material is then dried and the powders thus obtained are then granulated by means of a suitable binder, for example, a 10% aqueous polyvinyl alcohol solution. The granulate is then compressed, for example, into discs having a diameter of $\approx 6$ mm and a thickness of $\approx 0.50$ mm with a green density (density after compression) of approximately 55 to 60% of the theoretical density. Sintering of the pressed product is then carried out at a temperature of 1460° C. for 4 hours in a reducing atmosphere. The atmosphere may consist, for example, of water vapour-saturated mixed gas consisting of 90% of volume of $N_2$ and 10% by volume of $H_2$. Since the oxygen partial pressure of the mixed gas is determined by the ratio of the two partial pressures $p_{H2}/p_{H2O}$, the mixed gas should be saturated with $H_2O$ at $\approx 25°$ C. so as to create a standard reducing atmosphere. During the sintering it should be ensured that coarse granular structures occur preferably at sintering temperatures above 1440° C.

The reducing sintering is to be carried out in a closed furnace, for example, a tubular furnace is suitable. Excess reducing gas should preferably flow away through a bubble counter so as to create a stable sintering atmosphere.

Sintered bodies manufactured in this manner are semiconductive and show no open porosity anymore.

By re-oxidation of these sintered bodies in an oxidizing atmosphere, for example in air, electrically highly insulating oxide layers as grain boundary layers are produced in the semiconductor grain structures of the sintered bodies. Experiments which led to the present invention were carried out in different conditions:
 (a) at a fixed re-oxidiation duration of 120 minutes at different temperatures of 900° C., 1000° C., 1100° C., 1200° C., or 1300° C.
 (b) at a fixed temperature of 1100° C. and different re-oxidation durations of 5 minutes, 15 minutes, 30 minutes, 60 minutes, 120 minutes or 240 minutes.

2. MANUFACTURE OF NON-LINEAR RESISTORS

Electrodes of suitable metals, preferably of gold, were provided, for example by vapour deposition, on sintered bodies prepared as described above so as to form a resistor. For better adhesion of the electrode metal it is recommendable first to provide on the ceramic body a suitable adherent layer as an intermediate layer between ceramic and electrode metal; for example, a Cr-Ni-layer is suitable.

NOTES FOR SPECIAL COMPOSITIONS $(Sr_{1-x}La_x)TiO_3.yTiO_2$ (0.0005 < x < solubility limit of the La in the Perowskite phase; y = 0.001 to 0.02); when x < 0.0005, the bodies to be sintered oxidize too rapidly, and the reproducibility of the results is no longer ensured.

The upper limit of x appears from the solubility limit of the La in the Perowskite phase. Optimum results were achieved with sintered bodies having a grain structure with grains of a diameter of 80 to 120 $\mu$m with x = 0.01 and y = 0.01 at a sintering temperature of 1460° C. in a reducing atmosphere.

$Sr(Ti_{1-x}Nb_x)O_3.yTiO_2$ (0.0005 < x < solubility limit of the Nb in the Perowskite phase; y = 0.001 to 0.02): the same as described above for the La-dopings also applies to the lower limit of x; from x ≈ 0.03 and more, homogeneous microstructures were no longer obtained in a reproducible manner. Optimum results were achieved with sintered bodies having a grain structure with grains of a diameter of 60 to 80 $\mu$m with x = 0.01 and y = 0.01 at a sintering temperature of 1460° C. in a reducing atmosphere.

$Sr(Ti_{1-x}W_x)O_3.yTiO_2$ (0.0005 < x < solubility limit of the W in the Perowskite phase; y = 0.001 to 0.02): the same as described above for the La-dopings also applies to the lower limit of x; from x ≈ 0.01 predominantly fine-granular microstructures were observed, from x ≈ 0.06 and more a separation of foreign phases occurs increasingly in the microstructure which consists of $SrWO_4$ and $TiO_2$. Optimum results were achieved with sintered bodies having a grain structure with grains of a diameter of 60 to 80 $\mu$m, with x = 0.004 and y = 0.01 at a sintering temperature of 1460° C. in a reducing atmosphere.

3. RESULTS

FIG. 1 shows the current-voltage characteristic of a resistor having VDR-characteristic with a sintered body of the composition $(Sr_{0.99}La_{0.01})TiO_3.0.01TiO_2$. The current density in $mA/cm^2$ is plotted against the applied electrical field strength in kV/cm. In order to adjust the VDR-characteristic, the sintered body was re-oxidized in an oxidizing atmosphere at 1300° C. for 2 hours after having been sintered in a reducing atmosphere, as already described. The sintered body had a cross-sectional area of approximately 0.19 $cm^2$ and a thickness of approximately 400 $\mu$m.

FIGS. 2a to 2c show the operational voltages at a current of 1 mA and the current indices $\beta$ for resistors having sintered bodies of the following compositions dependent on the re-oxidation temperature:
 FIG. 2a: $Sr(Ti_{0.99}Nb_{0.01})O_3.0.01TiO_2$
 FIG. 2b: $(Sr_{0.99}La_{0.01})TiO_3.0.01TiO_2$
 FIG. 2c: $Sr(Ti_{0.996}W_{0.004})O_3.0.01TiO_2$.

The numbers beside the points in the individual curves indicate the temperatures at which re-oxidation was carried out in a oxidizing atmosphere for 2 hours. $A\beta = 1$ means a purely ohmic resistance with NTC-properties (in FIGS. 2a to 2c the operational voltage is plotted logarithmically so that values for $\beta = 1$ are not shown within the range of U-values given). Of all three material groups this value is reached prior to the re-oxidation and at low re-oxidation temperatures, respectively (see Tables 1 and 2). With the geometry chosen the resistance of the sintered body prior to the re-oxidation typically lies at values of a few ohms. This results in a resistivity of approximately 10 $\Omega$.cm. FIGS. 2a to 2c furthermore show that when the re-oxidation temperature is increased the $\beta$ value decreases very markedly, so a typical VDR-behaviour begins. In particular the sintered bodies doped with La show that already at low operational vaoltages of a few volts $\beta$ values of 0.16 were achieved. By further increasing the re-oxidation temperature, the operational voltage can be varied in a wide range with $\beta$ approximately constant.

FIG. 3 shows diagrammatically general pattern of the current and temperature dependence of the electric resistance for non-linear resistors according to the invention. In (R) (the logarithm of the electric resistance R) is plotted against the reciprocal temperature 1/T. The range I characterizes a pure NTC-behaviour, the range II characterizes a VDR-behaviour.

A range of constant increase in such a diagram results in a relation of R and T according to $R = A \cdot e^{B/T}$ (R = resistance, measured in $\Omega$;
 A = a constant having the dimension $\Omega$ essentially dependent on the outer shape of the resistor;
 e = base of the natural logarithm;
 B = a constant having the dimension K dependent on the outer shape and on the NTC-material;
 T = absolute temperature of the resistor in K).
In wide temperature ranges such a linear relation is given. In principle, however, two ranges are to be distinguished. A range I in which a high value of B, that is a strong temperature dependence, is to be observed with a simultaneously absent dependency on the applied current (NTC-behaviour) and a range II in which InR exhibits a flat characteristic, that it has a small temperature dependence. In this case, however, a considerable influence of the current on the resistance is to be noted, so this is the range in which VDR-properties predominate. Both ranges merge into each other with each time different current values and temperatures.

FIG. 4 shows graphically the current and temperature dependence of the electric resistance of a non-linear resistor of the composition $(Sr_{0.99}La_{0.01})TiO_3.0.01TiO_2$. The logarithm InR of the electric resistance (R) is plotted against the reciprocal absolute temperature. The sintered bodies were re-oxidized in air at temperature of 1100° C. and 1200° C., respectively, for 2 hours after having been sintered in a reducing atmosphere as described above.

The influence of the higher re-oxidation temperature is experienced here in a shift of the set of curves to higher resistance values.

The following Table 1 gives the numerical values of the non-linearity factor $\beta$ and the operational voltage $U_{1mA}$ for individual dopants and re-oxidation temperatures.

TABLE 1

| Re-oxidation temperature (°C); (Re-oxidation duration 2 h) | $Sr(Ti_{0.99}Nb_{0.01})O_3.0.01TiO_2$ | | $(Sr_{0.99}La_{0.01})TiO_3.0.01TiO_2$ | | $Sr(Ti_{0.996}W_{0.004})O_3.0.01TiO_2$ | |
|---|---|---|---|---|---|---|
| | Current index $\beta$ | Operational voltage $U_{1mA}(V)$ | Current index $\beta$ | Operational voltage $U_{1mA}(V)$ | current index $\beta$ | operational voltage $U_{1mA}(V)$ |
| 900 | 0.75 | 0.09 | 1 | 0.002 | 0.44 | 0.5 |
| 1000 | 0.6 | 0.21 | 0.94 | 0.017 | 0.19 | 5.1 |
| 1100 | 0.57 | 0.47 | 0.34 | 0.5 | 0.19 | 7.3 |
| 1200 | 0.24 | 3.2 | 0.16 | 2.2 | 0.15 | 12.5 |
| 1300 | 0.13 | 20.6 | 0.17 | 6.6 | 0.13 | 16.8 |

Thickness of the sintered bodies uniformly $\approx$ 400 μm
Diameter of the sintered bodies uniformly $\approx$ 5 mm.

Table 2 shows the influence of the re-oxidation duration at a constant temperature of 1100° C. In this case also it is confirmed that an increasing strength of the re-oxidation given by a higher temperature or longer re-oxidation duration, influences the values for the current index $\beta$ and the operational voltage $U_{1mA}$ (see also FIGS. 2a to 2c).

TABLE 2

| Re-oxidation (min) (re-oxidation temperature 1100° C.) | $Sr(Ti_{0.99}Nb_{0.01})O_3.0.01TiO_2$ | | $(Sr_{0.99}La_{0.01})TiO_3.0.01TiO_2$ | | $Sr(Ti_{0.996}W_{0.004})O_3.0.01TiO_2$ | |
|---|---|---|---|---|---|---|
| | Current index $\beta$ | Operational voltage $U_{1mA}(V)$ | current index $\beta$ | Operational voltage $U_{1mA}(V)$ | current index $\beta$ | Operational voltage $U_{1mA}(V)$ |
| 5 | 0.68 | 0.13 | 1 | 0.003 | 0.27 | 1.4 |
| 15 | 0.59 | 0.22 | 1 | 0.005 | 0.21 | 2.5 |
| 30 | 0.64 | 0.23 | 1 | 0.010 | 0.22 | 3.0 |
| 60 | 0.57 | 0.36 | 0.75 | 0.07 | 0.15 | 5.7 |
| 240 | 0.62 | 1.6 | 0.2 | 1.1 | 0.15 | 7.2 |

Thickness of the sintered bodies uniformly $\approx$ 400 μm
Diameter of the sintered bodies uniformly $\approx$ 5 mm.

Figure 5:
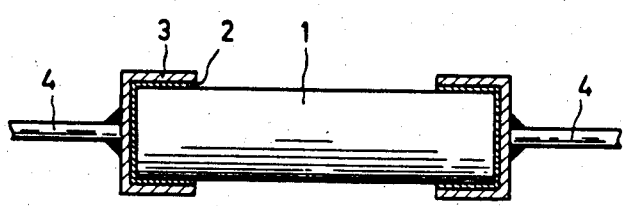

FIG. 5 shows a cross-section through a non-linear resistor with a ceramic sintered body (1) according to the invention. The body is on both sides provided with electrode-layers (2) and, metal electrode caps 3, on which connection leads (4) have been secured.

What is claimed is:

1. A method of manufacturing a non-linear resistor having a ceramic sintered body consisting of a polycrystalline alkaline titanate doped to n-type conductance with a metal oxide and which body has a Perowskite structure, consists of an alkaline earth metal titanate containing excess $TiO_2$, has a formula selected from the group consisting of $(Sr_{1-x}Ln_x)TiO_3.yTiO_2$ and $Sr(Ti_{1-x}Me_x)O_3.yTiO_2$ wherein Ln is a rare earth metal, Me is a metal having a valence of at least 5, $0.0005 < x <$ solubility limit of the Ln in the Perowskite phase and $y = 0.001$ to $0.02$, which sintered body is provided on its grain boundaries with insulating layers produced by re-oxidation, characterized in that the ceramic body is first sintered in a reducing atmosphere and that said sintered body is then re-oxidized in an oxidizing atmosphere, preferably in air, in which the sintered body becomes adjustable in its non-linear resistance variation by a selection of the re-oxidation temperature and the duration of the re-oxidation in such manner that an initially present NTC-characteristic is observable as a function of the oxidation state gradually only at increasing temperatures and in the range of the operating temperature of the resistor changes into a VDR-characteristic.

2. A method as claimed in claim 1, characterized by the following operational steps:

(a) grinding a mixture of the starting substances for an alkaline earth metal titanate having a Perowskite structure with an addition of a metal oxide having a doping function so as to produce an N-type conductivity and having a composition defined by one of the formulae

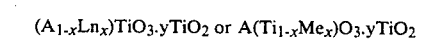

$(A_{1-x}Ln_x)TiO_3.yTiO_2$ or $A(Ti_{1-x}Me_x)O_3.yTiO_2$ wherein:
A = alkaline earth metal
Ln = rare earth metal including yttrium
Me = metal having a valency of 5 or more
$0.0005 < x <$ solubility limit in the Perowskite phase
$y = 0.001$ to $0.02$;

(b) pre-sintering the ground product formed by step (a) in a temperature range of 1050° to 1350° C. for 2 to 20 hours in air;

(c) grinding and granulating the pre-sintered product formed by step (b) with a suitable binder;

(d) compressing the granulated product formed by step (c) to form a moulded body suitable for a resistor;

(e) sintering the moulded body formed by step (d) in a reducing atmosphere at a temperature in the range of 1400° to 1500° C. for 1 to 10 hours;

(f) re-oxidizing the sintered body formed by step (e) in an oxidizing atmosphere, preferably in air, at a temperature in the range from 900° to 1300° C. for 5 to 240 minutes;

(g) providing metal electrodes on oppositely located surfaces of the re-oxidized sintered body formed by step (f).

3. A method as claimed in claim 2, characterized in that the alkaline earth metal titanate is formed by conversion of $SrCO_3$ with $TiO_2$ in the molar ratio from 1:1.001 to 1:1.02 by adding the doping metals in the form of their oxides in a quantity from 0.05 to maximum 60 mol% of the constituent to be substituted after grinding and pre-sintering at 1150° C. in air for 15 hours.

4. A method as claimed in claim 2, characterized in that $La_2O_3$ is used as a doping metal oxide.

5. A method as claimed in claim 2, characterized in that $Nb_2O_5$ is used as a doping metal oxide.

6. A method as claimed in claim 2, characterized in that $WO_3$ is used as a doping metal oxide.

7. A method as claimed in claim 2, characterized in that a 10% aqueous polyvinyl alcohol solution is used as a binder.

8. A method as claimed in claim 2, characterized in that the moulded body formed by step (d) is sintered at a temperature of 1460° C. in a reducing atmosphere consisting of water vapour-saturated mixed gas consisting of 90% by volume of $N_2$ and 10% by volume of $H_2$ for 4 hours.

9. A method as claimed in claim 8, characterized in that the mixed gas is saturated with $H_2O$ at $\approx 25°$ C.

10. A method as claimed in claim 2, characterized in that the sintered body formed by step (e) is re-oxidized in air at a temperature of at most 1200° C. for 30 minutes so as to maintain its NTC-characteristic in the operating temperature range about room temperature dependent on the nature of its doping.

11. A method as claimed in claim 2, characterized in that the sintered body formed by step (e) is re-oxidised in air at a temperature of 1100° C. for at least 5 minutes so as to obtain a VDR-characteristic at the operating temperature, dependent on the nature of its doping.

12. A method as claimed in claim 10, characterized in that for a resistor having NTC-characteristic a sintered body is chosen of the composition $(Sr_{0.99}La_{0.01})TiO_3.0.01TiO_2$ which is re-oxidized at a temperature of 1100° C. for 30 minutes.

13. A method as claimed in claim 11, characterized in that for a resistor having VDR-characteristic a sintered body of the composition $Sr(Ti_{0.996}W_{0.004})O_3.0.01TiO_2$ is chosen which is re-oxidized at a temperature of 1100° C. for 60 minutes.

* * * * *